United States Patent
Gehrken et al.

[15] 3,655,521
[45] Apr. 11, 1972

[54] PRETREATMENT PROCESS FOR THE DISTILLATION OF CRUDE PHTHALIC ANHYDRIDE

[72] Inventors: Hubert Gehrken, Weiden; Gerd Helms, Junkersdorf; Gerhard Keunecke, Geyen; Herbert Krimphove, Cologne-Mungersdorf, all of Germany

[73] Assignee: Chemiebau Dr. A. Zieren GmbH and Co. KG, Cologne, Germany

[22] Filed: Mar. 27, 1969

[21] Appl. No.: 842,417

[30] Foreign Application Priority Data

Mar. 27, 1968 Germany.................P 17 68 059.0

[52] U.S. Cl..................203/28, 203/88, 203/90, 203/DIG. 11, 260/346.7
[51] Int. Cl.....................B01d 3/06, C07c 63/18
[58] Field of Search..............203/88, 90, 28, DIG. 11; 260/346.7

[56] References Cited

UNITED STATES PATENTS

| | | |
|---|---|---|
| 2,670,325 | 2/1954 | West et al..........................260/346.7 |
| 2,786,805 | 3/1957 | Sullivan et al.....................260/346.7 |
| 3,011,955 | 12/1961 | Brown.....................................203/88 |
| 3,187,016 | 6/1965 | Brown et al.......................260/346.7 |
| 3,380,896 | 4/1968 | Scheeber et al. ......................203/88 |

Primary Examiner—Wilbur L. Bascomb, Jr.
Attorney—I. William Millen

[57] ABSTRACT

Crude liquid phthalic anhydride produced from the catalytic air oxidation of o-xylene, and containing minor quantities of acids such as phthalic acid and in addition, compounds more volatile than phthalic anhydride, is subjected to a special pretreatment to remove the acids and the more volatile materials, said pretreatment having a relatively short residence time and comprising heating said crude liquid phthalic anhydride under a first pressure in the liquid phase to a temperature of about 235°–330° C for a sufficient time to convert said phthalic acid to phthalic anhydride and then expanding said heated liquid to a lower pressure than said first pressure to volatilize gases containing at least a portion of said more volatile substances and simultaneously cool resultant liquid to a temperature lower than the boiling point of phthalic anhydride at said lower pressure.

9 Claims, 2 Drawing Figures

PRETREATMENT PROCESS FOR THE DISTILLATION OF CRUDE PHTHALIC ANHYDRIDE

BACKGROUND OF THE INVENTION

This invention relates to a process for the pretreatment of crude phthalic anhydride produced by the catalytic air oxidation of o-xylene.

In contradistinction to the naphthalene-based process, crude phthalic anhydride produced by the catalytic air oxidation of o-xylene contains no polymerizable components which must be eliminated by a polymerization and separation pretreatment prior to the distillation step.

However, the crude product produced from o-xylene does contain, in addition to phthalic anhydride, varying quantities of phthalic acid, benzoic acid, maleic acid, maleic anhydride, o-toluic acid, phthalide, higher boiling components, and a non-distillable residue. Because of economic and technical considerations, it is desirable to convert the acids, before entrance into a distillation plant, into the anhydrides thereof, with water being split off, and to remove other low-boiling components entirely or in part.

It is conventional to conduct this dehydration step in such a manner that the entire crude product is heated, in an agitated vessel or in cascades of agitated vessels, to temperatures of between 190° and 280° C. This process can be conducted discontinuously or continuously, but requires on a large industrial scale, considerable investment for the pretreatment plant. In addition, residence times of between about 5 and 100 hours are common, thereby increasing the investment capital even further for on-stream inventory.

SUMMARY OF THE INVENTION

In view of the above-described considerations, an object of this invention is to provide an improved pretreatment process.

A particular object is to provide a considerably shorter pretreatment residence time, while simultaneously removing the predominant portion of the more readily volatile impurities.

Upon further study of the specification and claims, other objects and advantages of the present invention will become apparent.

To attain the above objects, the pretreatment is conducted by heating the liquid crude phthalic anhydride under a pressure of $p^1$ to a temperature of at least about 285° C., preferably about 285°–330° C., and then cooling same by expansion into a chamber under a lower pressure $p^2$, said cooling being sufficient to reduce the crude liquid to below the boiling temperature of phthalic anhydride at the pressure $p^2$. By heating under pressure, the rate of any decarboxylation reactions is decreased so that the yield of phthalic anhydride is not impaired. During the expansion of the liquid phthalic anhydride from the pressure $p^1$ to the pressure $p^2$, the water formed during the anhydride production as well as the more readily volatile impurities are transferred into the gaseous phase, thereby resulting in liquid product containing only a comparatively minor proportion of the more volatile impurities.

DETAILED DISCUSSION OF THE INVENTION

The heating under pressure is conducted up to a temperature sufficient to evaporate the more volatile components during the expansion step. When the crude is highly contaminated with volatile components, it is not necessary to increase the temperature above 330° C. corresponding to a pressure $p^1$ of about 8.6 atmospheres absolute. The temperature is adjusted in relationship to the content of the more volatile impurities so that, by the expansion to pressure $p^2$ in the expansion chamber, a temperature is obtained at which the more volatile components are evaporated, but with as little as possible of the phthalic anhydride being evaporated. Consequently, the temperature, after the expansion, must be below the boiling temperature of the phthalic anhydride at expansion pressure $p^2$.

In any case, the pressure $p^1$ is usually about 1.5 to 3.6 atmospheres absolute, $p^2$ about 0.1 to 1.0 atmospheres absolute, and the temperature after expansion about 180° to 285° C. preferably 220° to 270° C.

By this pretreatment there is obtained an unexpectedly high degree of preliminary purification of the crude phthalic anhydride, utilizing residence times of below 120 minutes, and preferably between only 1 and 40 minutes. (By "residence time" in this connection is meant the time it takes for the crude phthalic anhydride to pass through the heating step.)

In accordance with a preferred embodiment of this invention, the heated phthalic anhydride under a pressure $p^1$ is cooled to below 285° C. by expansion into a chamber under atmospheric pressure. Since the expansion chamber in this case is under atmospheric pressure ($p^2 = 1$ atmosphere absolute), there is no requirement for any vacuum equipment and the like. In general, heating the crude phthalic anhydride to a temperature of about 290° to 310° C., preferably 300° C. at a pressure $p^1$ of about 3.5 to 6.5, preferably 5.5 atmospheres is sufficient to obtain, after expansion to normal pressure, a satisfactory preliminary purification of the phthalic anhydride within less than 60 minutes. On the one hand, by heating at high temperatures under pressure in the first step, the rate of heat transmission into the crude liquid mass is increased and, on the other hand, in the second step, by the expansion, the removal of the more readily volatile components from the crude liquid is improved, particularly if the expansion is conducted by means of a spray nozzle into the expansion chamber.

Preferably the gases withdrawn from the expansion step are withdrawn through a dephlegmator, the surface temperature of which on the gas side is maintained at about 180°–240° C. In this manner the excessive quantities of any phthalic anhydride which might accidentally evaporate during the expansion step are condensed within the dephlegmator. The temperature range to be maintained in the dephlegmator is determined, on the one hand, by the consideration that no phthalic acid must form from the condensing phthalic anhydride and water and, on the other hand, that the waste gas is to remove as little phthalic anhydride as possible entrained therewith.

In accordance with the preferred embodiment, the liquid, crude phthalic anhydride is continuously pumped at 160° C., for example, into a heat exchanger. While flowing through the heat exchanger tubes, the phthalic anhydride is heated to the desired temperature, e.g. 300° C. In this manner, a continuous heating is made possible, which can then be combined with a continuous operation of the expansion tank, thereby resulting in an overall continuous pretreatment.

It is also possible, of course, to heat the phthalic anhydride batch-wise in a heated autoclave. In this case, the phthalic anhydride is suitably agitated in order to improve the heat transfer. The batch-wise operation of two autoclaves can be combined with a continuous expansion operation, by discharging the contents of one pressure vessel into the expansion tank while another pressure vessel is being filled with a batch of crude phthalic anhydride and heated.

A further preferred technique is to provide that the heated liquid phthalic anhydride is finely distributed in the gaseous phase of the expansion chamber. In this manner, the more volatile components can flash from the resultant phthalic anhydride droplets without considerable evaporation of the phthalic anhydride.

The phthalic anhydride obtained in the liquid phase after the expansion, is continuously withdrawn from the expansion chamber. It can be fed directly to a distillation plant which operates continuously or it is also possible to collect the prepurified phthalic anhydride in the expansion tank and feed it in batches to the still pot of a batch distillation device.

DESCRIPTION OF THE DRAWINGS

Two embodiments of the process of this invention will now be described in greater detail with reference to the drawings wherein.

DESCRIPTION OF THE SPECIFIC EMBODIMENTS

Figure 1:
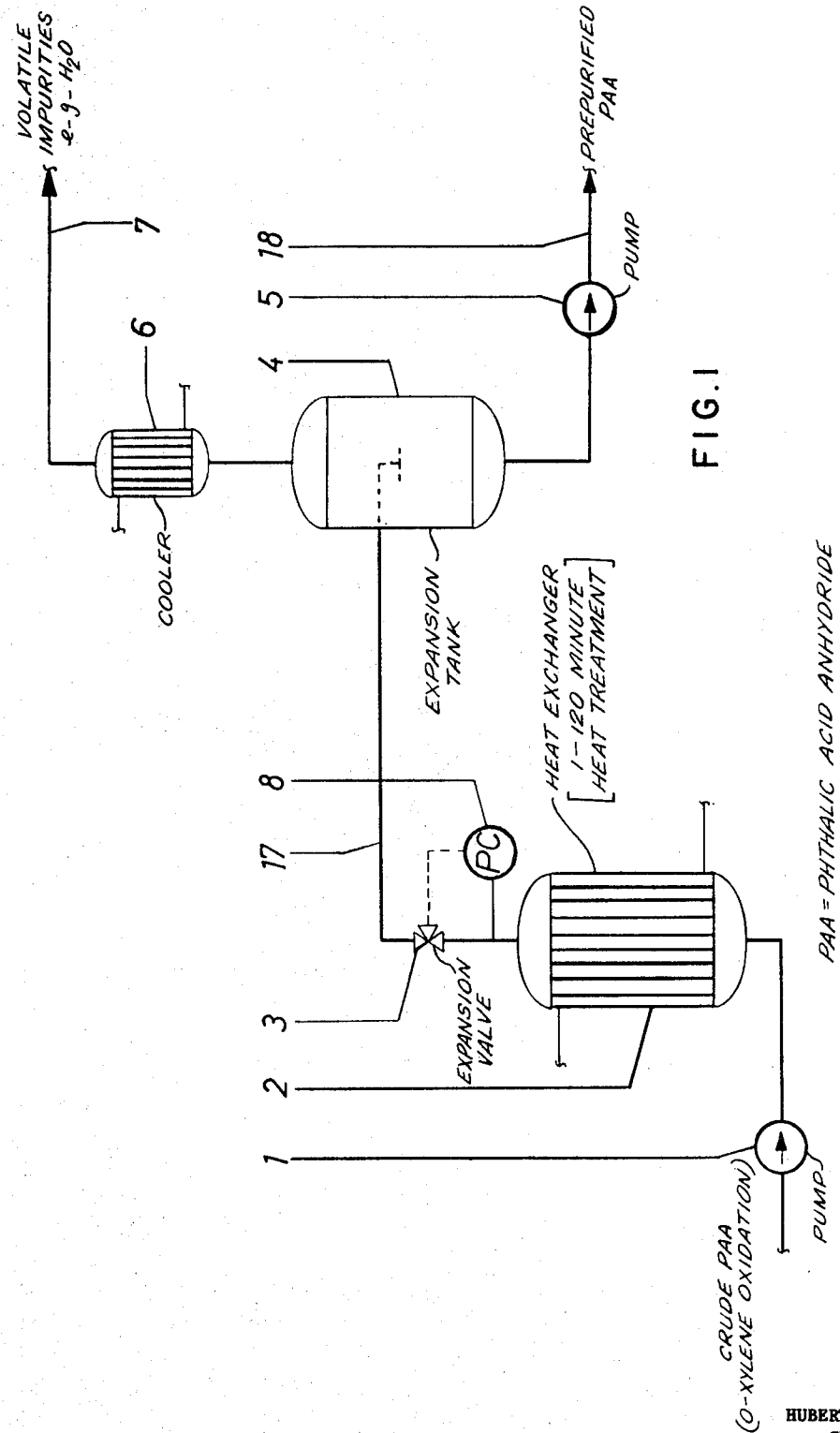
FIG. 1 is a schematic view of a plant for one embodiment of the process of the present invention, with continuous heating of the crude phthalic anhydride in a heat exchanger.

In the operation of the plant according to FIG. 1, the crude, liquid phthalic anhydride is pumped, at a temperature of 160° C., through the pump 1 into the heat exchanger 2. In the heat exchanger 2, the phthalic anhydride is heated to a temperature of 295° C. Then, the phthalic anhydride passes through expansion valve 3, pipeline 17 and into the expansion tank 4. Pipeline 17 terminates as spraying means in said expansion tank.

Expansion valve 3 is regulated by a pressure controller 8 so that a sufficiently high pressure is maintained in the heat exchanger 2. It is also possible to effect a temperature control by further opening of the expansion valve 3 in response to an increase in the temperature of the phthalic anhydride at the exit of the heat exchanger 2.

After the phthalic anhydride is sprayed into the expansion tank 4, a larger portion of the readily volatile components escapes into the gaseous phase, whereas the liquid, prepurified phthalic anhydride collects at the bottom of the expansion vessel 4. The interior of the tank 4 is under atmospheric pressure. The gas phase can escape from the tank 4 via a conduit 7 to cooling unit 6, i.e. cooling as compared to the temperature of the gas phase. The cooler 6 is "cooled" by a thermal oil and is maintained at 230° C., so that concomitantly evaporated phthalic anhydride is condensed therein and flows back into the expansion tank 4. Water and the volatile components removed from the phthalic anhydride pass through the cooling unit 6 and escape through the conduit 7.

The prepurified phthalic anhydride is continuously fed from the tank 4 through the line 18, by means of a pump 5, to the preliminary column of a continuous distillation plant. Of course, it is also possible to combine this arrangement with a batch distillation unit; in this case, the expansion vessel 4 or another tank (not illustrated) arranged in the conduit 18 serves as the collecting vessel.

Figure 2:
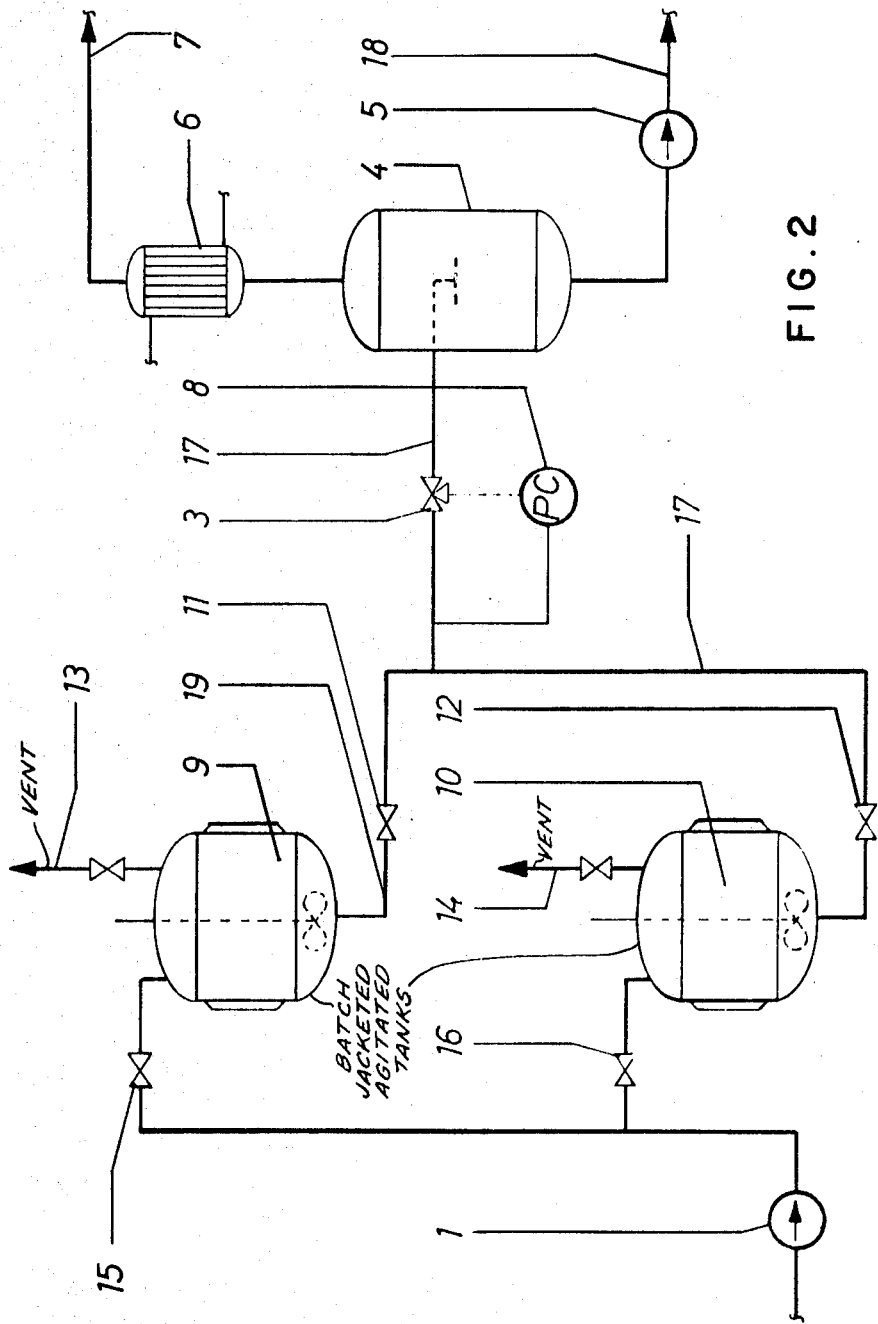
FIG. 2 shows, in a schematic representation, a plant for a second embodiment of the process of this invention with batch heating of the crude phthalic anhydride in two heated agitated autoclaves.

The plant illustrated in FIG. 2 differs from the plant shown in FIG. 1 only with respect to the heating section. The crude phthalic anhydride, at a temperature of 170° C., is alternately pumped by means of a pump 1 from a storage tank (not shown), with valve 16 closed and valve 15 open, into agitated tank 9 and, with valve 15 closed and valve 16 open, into the agitated tank 10. The agitated tanks 9, 10 are provided with conventional heating devices (jackets) and ventilating valves 13, 14.

While the phthalic anhydride is pumped into the agitated tank 9 and heated to a temperature of 300° C., the heated phthalic anhydride from tank 10 is introduced under pressure, after the valve 12 is opened, through conduit 17 into the expansion tank 4. The expansion valve 3 associated with the pressure controller 8 is disposed in the line 17 between the connection of the line 19 and the expansion tank 4. After the tank 10 has been emptied, the phthalic anhydride in tank 9 has reached a temperature of 300° C. Then, valve 12 is closed, and valve 11 is opened, so that the expansion vessel 4 with the sections of the plant adjoining thereto can be operated continuously. The operation of the expansion tank with the associated plant components 5 to 7 is the same as that of FIG. 1.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

In a heat exchanger, 25 kg./h. of crude phthalic anhydride is continuously heated to 295° C. under a pressure of 4.25 atmospheres. The crude phthalic anhydride contains 94.4 percent by weight of phthalic anhydride, 4.5 percent by weight of phthalic acid, 0.4 percent by weight of maleic acid and maleic anhydride, 0.1 percent by weight of benzoic acid, 0.08 percent by weight of phthalide, 0.1 percent by weight of o-toluic acid, 0.18 percent by weight of residue and higher-boiling unknown components, and 0.22 percent by weight of unknown substances more volatile than phthalic anhydride. The water-soluble residue of the crude product was 0.13 percent by weight. After an initial heating time of 15 minutes, the hot phthalic anhydride passed to an expansion tank where it is expanded to atmospheric pressure. On pressure reduction through spraying means mounted in the center of the expansion vessel, flash evaporation serves to cool the mixture to 280° C., the liquid being collected on the bottom of the vessel and being continuously withdrawn therefrom. The vapors are cooled by a cooling unit maintained at 230° C. by means of a thermal oil, so that the main portion of the thus-evaporated phthalic anhydride flows back into the expansion vessel. Water and a portion of the organic components more volatile than phthalic anhydride pass into the atmosphere through the cooler.

From the expansion vessel are withdrawn, on the average, 24.65 kg./h. of pretreated crude product having the following composition: 99.4 percent by weight of phthalic anhydride, 0.18 percent by weight of maleic anhydride, 0.05 percent by weight of benzoic acid, 0.07 percent by weight of phthalide, 0.29 percent by weight of residue and unknown substances less volatile than phthalic anhydride, and 0.01 percent by weight of unknown substances more volatile than phthalic anhydride. The pretreated product contains 0.26 percent by weight of water-insoluble residue.

EXAMPLE 2

An agitated autoclave with a 50 l. capacity was filled with 40 kg. of crude phthalic anhydride containing 92.8 percent by weight of phthalic anhydride, 6.2 percent by weight of phthalic acid, 0.35 percent by weight of maleic anhydride and maleic acid, 0.15 percent by weight of benzoic acid, 0.08 percent by weight of phthalide, 0.08 percent by weight of o-toluic acid, 0.25 percent by weight of residue and higher-boiling unknown components, and 0.22 percent by weight of unknown substances more volatile than phthalic anhydride. The product furthermore contains 0.2 percent by weight of water-insoluble residue.

The crude product was heated in the autoclave to 305°–308° C. within 30 minutes, with an ambient pressure which adjusted itself to 7 atmospheres absolute. The contents of the autoclave were then expanded via an expansion valve into an expansion tank of 100 l. capacity, to atmospheric pressure. A pretreated product (39.35 kg.) was obtained having the following composition: 99.3 percent by weight of phthalic anhydride, 0.2 percent by weight of maleic anhydride, 0.05 percent by weight of benzoic acid, 0.07 percent by weight of phthalide, 0.32 percent by weight of residue and unknown substances higher boiling than phthalic anhydride, as well as 0.05 percent by weight of unknown substances more volatile than phthalic anhydride. The water-insoluble residue of the product is 0.28 percent by weight.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the pretreatment of crude liquid phthalic anhydride containing substances more volatile than phthalic anhydride and a minor quantity of phthalic acid, said crude having been produced from o-xylene by catalytic air oxidation, said process comprising heating said crude liquid phthalic anhydride under a first pressure in the liquid phase to a temperature of about 285°–330° C. for a residence time of 1 – 120 minutes, said residence time being sufficient to dehydrate said phthalic acid to phthalic anhydride and then expanding said heated liquid to atmospheric pressure, a lower pressure than said first pressure, to flash vaporize gases containing at least a portion of said more volatile substances, thereby simultaneously cooling resultant liquid to a temperature below 285° C.

2. A process according to claim 1 comprising the further step of passing said gases containing at least a portion of said more volatile substances through a dephlegmator, the surface temperature of which is maintained, on the gas side, between 180° and 240° C.

3. A process according to claim 1 wherein the phthalic acid of said crude liquid phthalic anhydride is dehydrated by continuously passing same through a heat exchanger.

4. A process according to claim 1 wherein the phthalic acid of said crude liquid phthalic anhydride is dehydrated batchwise in a heatable pressure vessel.

5. A process according to claim 1 wherein said heated crude liquid phthalic anhydride is expanded in the form of droplets into the expansion chamber.

6. A process as defined by claim 1 wherein said residence time is about 1–40 minutes.

7. A process as defined by claim 1 wherein said residence time is 15–60 minutes, and the heating temperature is 290°–310° C.

8. A process as defined by claim 1 wherein said residence time is no shorter than 15 minutes.

9. A process as defined by claim 1 wherein said residence time is no shorter than 30 minutes.

* * * * *